(No Model.)

E. ANDERSON.
HORSESHOE.

No. 601,541. Patented Mar. 29, 1898.

Witnesses:
Karl A. Andrén
Charles A. Harris

Inventor:
Emil Anderson
by Alban Andrén
his atty.

UNITED STATES PATENT OFFICE.

EMIL ANDERSON, OF BOSTON, MASSACHUSETTS.

HORSESHOE.

SPECIFICATION forming part of Letters Patent No. 601,541, dated March 29, 1898.

Application filed October 19, 1897. Serial No. 655,675. (No model.)

*To all whom it may concern:*

Be it known that I, EMIL ANDERSON, a citizen of the United States, and a resident of Boston, in the county of Suffolk and State of Massachusetts, have invented new and useful Improvements in Horseshoes, of which the following, taken in connection with the accompanying drawings, is a specification.

This invention relates to improvements in horseshoes, and it is carried out as follows, reference being had to the accompanying drawings, wherein—

Figure 1:
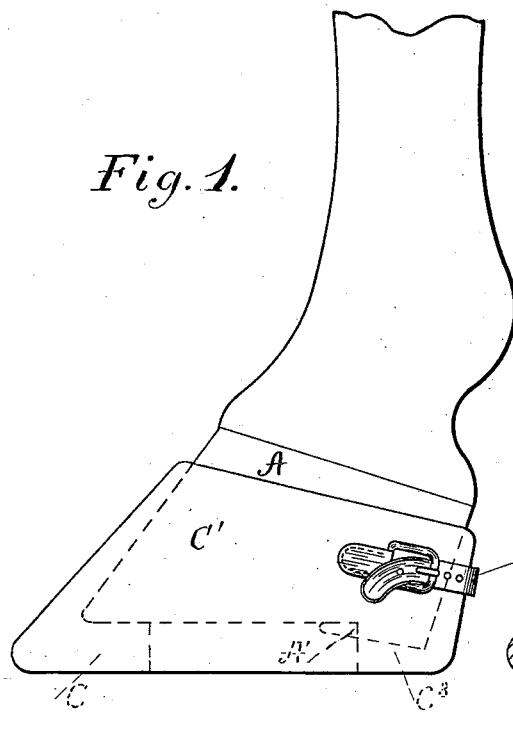
Figure 2:
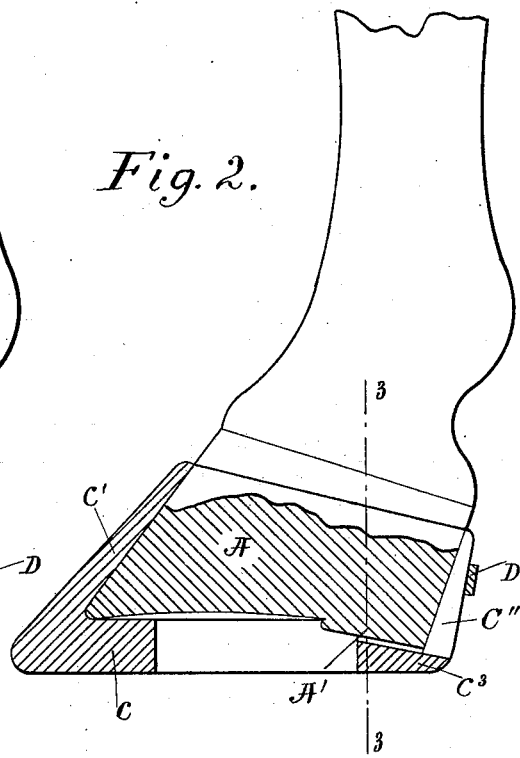
Figure 4:
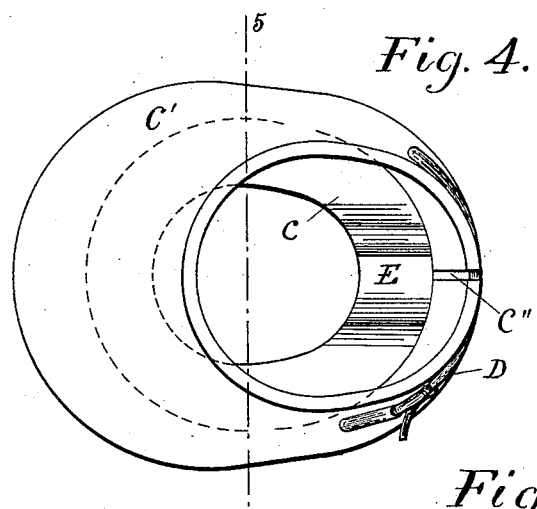
Figure 3:
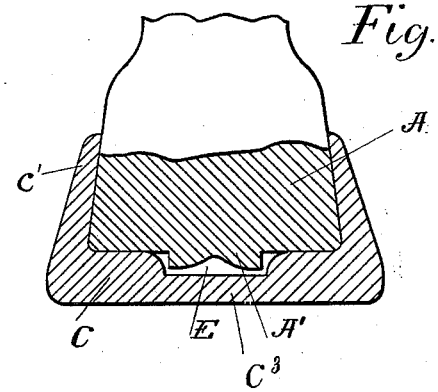
Figure 5:
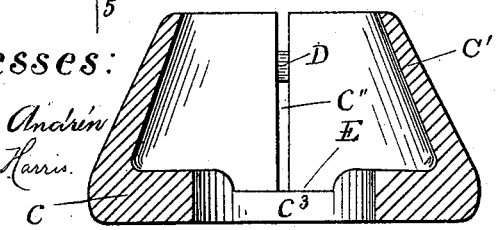

Figure 1 represents a side elevation of the invention shown as applied to a horse's foot.
Fig. 2 represents a central vertical section of the invention, also shown as attached to a horse's foot. Fig. 3 represents a cross-section on the line 3 3, shown in Fig. 2. Fig. 4 represents a top plan view of the improved horseshoe; and Fig. 5 represents a cross-section on the line 5 5, shown in Fig. 4.

Similar letters refer to similar parts wherever they occur on the different parts of the drawings.

In the drawings, A represents the hoof of a horse's leg, and A' represents the frog on the under side of the hoof, as usual.

The improved horseshoe is made of rubber, and consists of a preferably oval-shaped ring C, adapted to serve as a protector for the under side of the hoof, as shown. In one piece with said ring or base C is made the upwardly-projecting hoof band or envelop C', which is slitted at one place, preferably at the rear portion, as shown at C'' in Figs. 2 and 4, and there provided with a suitable fastening device, such as a strap and buckle D or other well-known or equivalent locking device, as may be found most convenient and practical, for the purpose of securing the shoe to the hoof and to permit of the easy removal therefrom whenever so desired.

At the place directly below the frog portion A', I make on the upper side of the ring C a cut-away portion E, below which is a reduced portion $C^3$ of the ring C, as shown in the drawings, by which arrangement the frog is caused to be received in such cut-away portion E, thus preventing undue pressure on the frog when the shoe is placed on the hoof.

The improved shoe, being elastic, is very servicable for horses with tender feet and can be applied readily to the feet without the need of nails or other similar fastening devices.

In attaching the shoe to a horse's foot it is only necessary to slightly expand the envelop or shield C' sufficiently to enable the hoof to be inserted into the shoe, after which the boot is secured to the hoof by means of the fastening-strap D or equivalent fastening device, as shown.

What I wish to secure by Letters Patent and claim is—

As a new article of manufacture, the herein-described horseshoe, consisting of a rubber base-ring C having a central open portion and recessed on its upper, rear portion, as at $C^3$, for the reception of the frog of the hoof, and a slitted rubber hoof band or envelop provided with fastening devices, substantially as shown and described.

In testimony whereof I have signed my name to this specification, in the presence of two subscribing witnesses, on this 6th day of October, A. D. 1897.

EMIL ANDERSON.

Witnesses:
KARL A. ANDRÉN,
ALBAN ANDRÉN.